United States Patent
Schwarz

(10) Patent No.: US 8,847,540 B2
(45) Date of Patent: Sep. 30, 2014

(54) CONTROL SYSTEM FOR SINGLE-PHASE INDUCTION MOTOR AND CONTROL METHOD FOR SINGLE-PHASE INDUCTION MOTOR

(75) Inventor: Marcos Schwarz, Joinville SC (BR)

(73) Assignee: Whirlpool S.A., Sao Paulo (BR)

(*) Notice: Subject to any disclaimer, the term of this patent is extended or adjusted under 35 U.S.C. 154(b) by 509 days.

(21) Appl. No.: 13/255,750

(22) PCT Filed: Mar. 10, 2010

(86) PCT No.: PCT/BR2010/000066
§ 371 (c)(1),
(2), (4) Date: Nov. 22, 2011

(87) PCT Pub. No.: WO2010/102364
PCT Pub. Date: Sep. 16, 2010

(65) Prior Publication Data
US 2012/0056577 A1    Mar. 8, 2012

(30) Foreign Application Priority Data
Mar. 10, 2009  (BR) .................................... 0900726

(51) Int. Cl.
*H02P 3/18*    (2006.01)
(52) U.S. Cl.
USPC ............................................ 318/751; 318/774
(58) Field of Classification Search
USPC .......................... 318/751, 727, 774
See application file for complete search history.

(56) References Cited

U.S. PATENT DOCUMENTS

| | | | |
|---|---|---|---|
| 3,696,281 A | | 10/1972 | Gramkow et al. |
| 4,078,192 A | * | 3/1978 | Fultz .............................. 318/799 |
| 4,431,958 A | * | 2/1984 | Schutten et al. .............. 318/816 |
| 4,769,581 A | * | 9/1988 | Rilly ......................... 318/400.01 |
| 5,077,512 A | * | 12/1991 | Weber ............................ 318/776 |
| 5,138,200 A | | 8/1992 | Barsanti et al. |
| 5,424,624 A | | 6/1995 | Senak, Jr. |
| 5,661,390 A | | 8/1997 | Lipo et al. |

(Continued)

FOREIGN PATENT DOCUMENTS

| | | |
|---|---|---|
| EP | 0 367 006 | 5/1990 |
| JP | 4 285 487 | 10/1992 |

OTHER PUBLICATIONS

International Search Report mailed Aug. 26, 2010 for International application No. PCT/BR2010/000066.

(Continued)

*Primary Examiner* — Rina Duda
(74) *Attorney, Agent, or Firm* — Fay Sharpe LLP

(57) ABSTRACT

A control system for a single-phase induction motor including at least: one electronic control, a main switch, an auxiliary switch, one voltage conditioner block, the main switch being electrically associated to the main winding and the auxiliary switch to the auxiliary winding, the control circuit being electrically associated to the voltage conditioner block and to the switches, the switches being turned on or off by the control circuit, the control system and the motor being electrically associable to an alternating voltage source, the conditioner block is associated in parallel to the auxiliary switch, the conditioner block being capable of accumulating energy when the auxiliary switch is turned off, the conditioner block being arranged to supply electrical power greater than a minimum value to the control circuit, for at least a start-up time, by way of the energy accumulated in the conditioner block, when the switches are turned on.

11 Claims, 2 Drawing Sheets

(56) References Cited

U.S. PATENT DOCUMENTS

Figure 1:
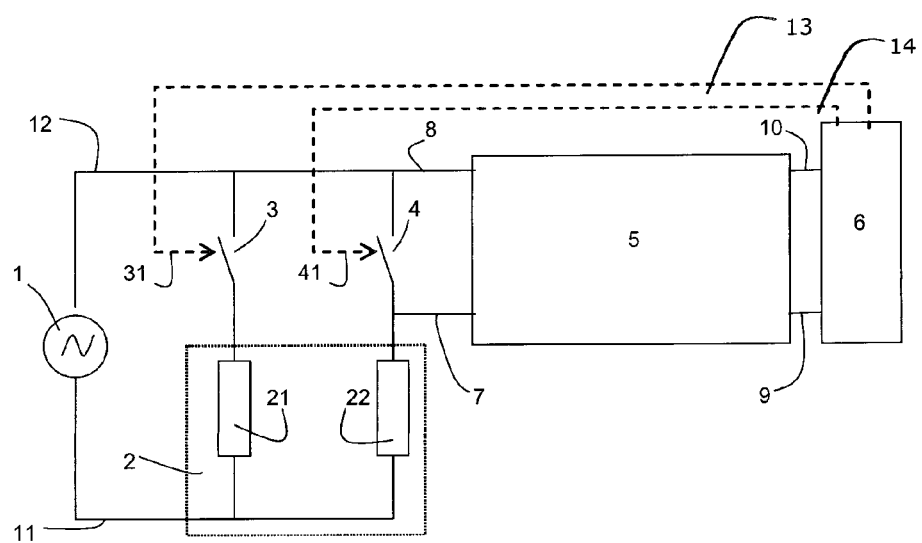

| | | |
|---|---|---|
| 6,194,682 B1 | 2/2001 | Schneider et al. |
| 6,570,778 B2 * | 5/2003 | Lipo et al. .................. 363/41 |
| 2003/0169014 A1 * | 9/2003 | Kadah ...................... 318/727 |
| 2005/0162140 A1 | 7/2005 | Hirst |
| 2009/0218981 A1 * | 9/2009 | Heckenbach ............. 318/799 |

OTHER PUBLICATIONS

Written Opinion mailed Aug. 26, 2010 for International application No. PCT/BR2010/000066.

International Preliminary Report on Patentability issued Sep. 13, 2011 for International application No. PCT/BR2010/000066.

* cited by examiner

CONTROL SYSTEM FOR SINGLE-PHASE INDUCTION MOTOR AND CONTROL METHOD FOR SINGLE-PHASE INDUCTION MOTOR

The present invention refers to a control system for a single-phase induction motor having an optimized arrangement capable of avoiding the interference of potential noise, or transients, present in the mains of the motor, since the control circuit now proposed is not directly connected to said mains.

Additionally, the present invention provides a control method for a single-phase induction motor capable of providing suitable drive for said motor.

DESCRIPTION OF THE STATE OF THE ART

It is known that normally charges connected to the alternating current mains, such as compressors, ventilators and pumps, comprise an electronic control circuit directly connected to said mains to provide its electrical power.

Oftentimes, said disposition means the voltage present in the mains is supplied directly to the electronic control circuit, it being subject to all variations or transients present in the mains.

In order to avoid such situation, it becomes necessary to install arrangements, or circuits, capable of guaranteeing the integrity of said electronic control circuit. In this sense, filters or suppressors and transients are used. However, said components may sustain damage due to the high power surges present in the mains, or owing to atmospheric discharges, mains operations, etc.

Said solutions involve high cost and installation space which is not always available. The use of voltage stabilizers is also adopted in some cases, yet this practice further increases the costs required to correct said problem.

More particularly, concerning control systems for single-phase induction motors existing in the state of the art, it is noted that said solutions do not offer an arrangement capable of avoiding the drawbacks described above, namely, interference from noise and transients present in the electrical power line.

North American patent U.S. Pat. No. 5,424,624 refers to a driver circuit for an electrical actuator. Additionally, there is provided a power storage circuit, having a DC power source, designed to power a driver circuit. The subject matter disclosed by document U.S. Pat. No. 5,424,624 refers to a circuit particularly applied to drive inductive charges from the power accumulated in a recovery circuit.

However, it is noted that said disposition does not present a solution designed for the use of a voltage conditioner block, not powered directly by the mains, and capable of powering a control circuit designed to command a single-phase induction motor.

The North American patent U.S. Pat. No. 3,696,281 refers to a start-up circuit for a single-phase induction motor. However, said circuit does not include an arrangement capable of controlling the induction motor from a dedicated control circuit, powered by a voltage conditioner block.

North American patent application US 2005/0162140 refers to a switching circuit specially designed to control alternating current electrical energy, and more particularly inductive charges.

The switching circuit disclosed in patent document US 2005/0162140 does not address the use of a voltage conditioner block specially applied to power a control circuit, and capable of avoiding interference of noise, or transients from the mains, since the charge pump does not present an optimized connection scheme, such as that proposed in the present invention.

Based on the above, the present invention offers an innovative solution for a control system for a single-phase induction motor, combining the use of a voltage conditioner block and a control circuit, in order to command the drive of the motor through its entire operating cycle.

Moreover, the present solution confers greater reliability to the control system as a whole, based on the parallel connection of said block to the auxiliary switch of the start-up winding, chiefly avoiding, as already mentioned, any noise and transients present in the power line in which the motor is installed.

Objectives of the Invention

A first objective of the present invention is to propose a control system for a single-phase induction motor having an optimized arrangement capable of avoiding interference from potential noise, or transients, present in the mains of the motor, since the control circuit now proposed is not directly connected to said mains.

A second objective of the present invention is to propose a control method for a single-phase induction motor capable of providing suitable drive for said motor based on the present arrangement.

BRIEF DESCRIPTION OF THE INVENTION

The first objective of the present invention is achieved by providing a control system for a single-phase induction motor comprising at least one electronic control circuit, at least a main switch, at least an auxiliary switch, at least one voltage conditioner block, the main switch being electrically associated to a main winding of the single-phase induction motor, the auxiliary switch being electrically associated to an auxiliary winding of the single-phase induction motor, the electronic control circuit being electrically associated to the voltage conditioner block by way of first and second power terminals, the electronic control circuit being electrically associated to the main and auxiliary switches by way of first and second command terminals, the main and auxiliary switches being turned on or off by the electronic control circuit, in order to energize or de-energize the main and auxiliary windings, and control system for a single-phase induction motor and the single-phase motor being electrically associable to an alternating voltage source, the voltage conditioner block is associated in parallel to the auxiliary switch by way of first and second connection terminals, the voltage conditioner block being capable of accumulating electrical energy when the auxiliary switch is turned off, the voltage conditioner block being arranged to supply electrical power greater than a minimum electrical voltage value to the electronic control circuit, by way of first and second power terminals, for at least one start-up time, by way of the energy accumulated in the voltage conditioner block, when the main and auxiliary switches are turned on.

It is a second objective of the present invention to provide a control system for a single-phase induction motor, such that the voltage conditioner block is electrically associated and in parallel to the main switch or to the main switch by way of first and second connection terminals, the voltage conditioner block being capable of accumulating electrical energy when the auxiliary switch is turned off, the inductive behavior of the auxiliary winding or of the main winding of the single-phase induction motor being capable of filtering noise and transients existing in the alternating voltage source.

The third objective of the present invention is achieved by providing a control method for a single-phase induction motor, the single-phase induction motor comprising a main winding and an auxiliary winding, the main and auxiliary windings being associable respectively to the main and auxiliary switches, said method comprising the following steps:

- electrically connect the main and auxiliary windings of the single-phase motor to a first end of the main and auxiliary switches respectively;
- connect a voltage conditioner block in parallel to the auxiliary switch by way of first and second connection terminals;
- connect the voltage conditioner block to an electronic control circuit by way of first and second power terminals;
- connect the electronic control circuit to the main and auxiliary switches by way of first and second command terminals of the electronic control circuit and first and second drive terminals of the switches;
- electrically connect the single-phase induction motor, a first connection terminal of the voltage conditioner block and a second end of the main and auxiliary switches to an alternating voltage source;
- if the main and auxiliary windings are turned off, supply power to the voltage conditioner block by way of the first and second connection terminals;
- if the main and auxiliary windings are turned on by the electronic control circuit, by way of the first and second drive terminals of the main and auxiliary switches, supply electrical power to the electronic control circuit, for a start-up time, by way of energy accumulated in the voltage conditioner block;
- if the main winding is turned on and the auxiliary winding is turned off, supply power to the voltage conditioner block by way of the first and second connection terminals.

SUMMARY DESCRIPTION OF THE DRAWINGS

Figure 2:
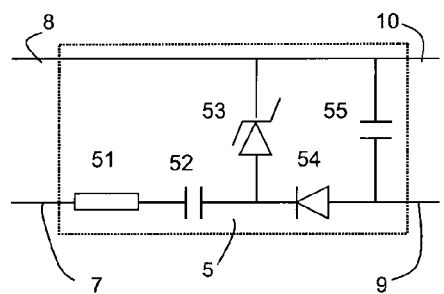
Figure 3:
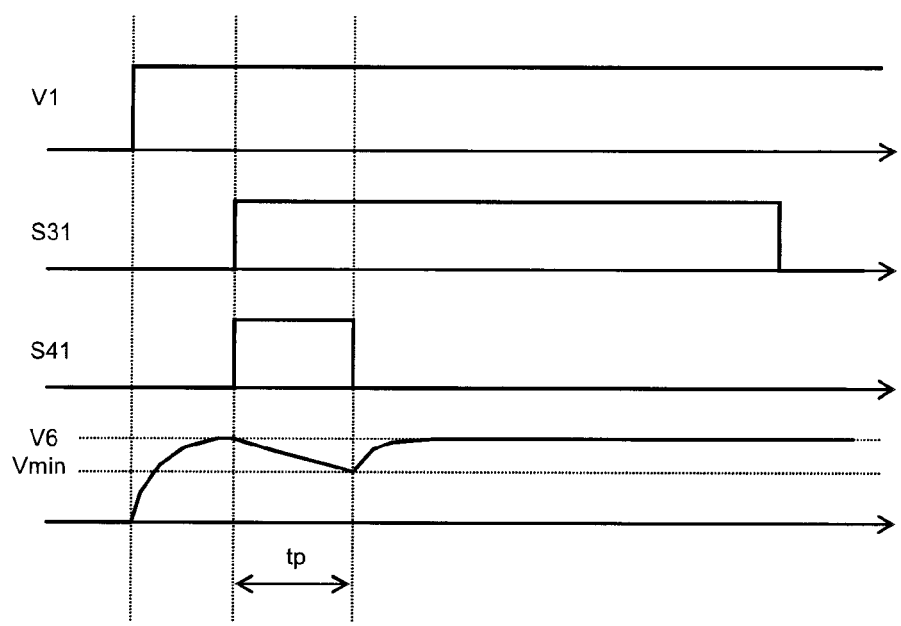

The present invention will now be described in greater detail with reference to the drawings appended hereto, wherein:

FIG. 1—represents a schematic view identifying the main components of the control system for a single-phase induction motor, according to the teachings of the present invention;

FIG. 2—represents a schematic view of a preferred embodiment of the voltage conditioner block, pursuant to the invention object now proposed; and FIG. 3—represents a graph identifying the phases involved in operating the control system of an induction motor, according to the present invention.

DETAILED DESCRIPTION OF THE DRAWINGS

As mentioned previously, the invention object now proposed offers an efficient and innovative system compared to the solutions of the state of the art, specially designed for controlling a single-phase induction motor having an optimized arrangement, and capable of avoiding interference of potential noise, transients or power surges, normally present in a mains, since the voltage conditioner block 5, detailed ahead, is not directly connected to the mains.

More particularly, and as illustrated in FIG. 1, the present control system for a single-phase induction motor comprises at least one electronic control circuit 6, at least a main switch 3, at least an auxiliary switch 4 and at least one voltage conditioner block 5.

Said keys can be formed by thyristor-like (triacs) electronic devices, but other elements that play the role of electronic switch can be used pursuant to the teachings of the present invention.

Preferably, said electronic control circuit 6 can be comprised of a microprocessor, or microcontroller, however other circuit arrangements can be implemented to drive the main and auxiliary switches 4.

FIG. 1 also shows that the main switch 3 is electrically associated to a main winding 21 of the single-phase induction motor 2.

Additionally, note that the auxiliary switch 4 is electrically associated to an auxiliary winding 22 of the single-phase induction motor 2. FIG. 1 also shows that the electronic control circuit 6 is electrically associated to the voltage conditioner block 5 by way of first 9 and second 10 power terminals.

It is important to emphasize that the purpose of said voltage conditioner block 5 is to accumulate energy, and adjust the polarity and the voltage value supplied to the first 9 and second 10 power terminals.

Said electronic circuit 6 is associated, as can be seen in FIG. 1, to the main 3 and auxiliary 4 switches by way of first 13 and second command terminals 14.

It can be noted in FIG. 1 that the present control system and the single-phase motor 2 are electrically associable to an alternating voltage source 1.

An innovative characteristic of the present invention refers to the fact that the voltage conditioner block 5 is associated in parallel to the auxiliary switch 4 by way of first 7 and second 8 connection terminals, said block 5 being capable of providing electrical power to the electronic control circuit 6 by way of the first 9 and second 10 power terminals.

Said arrangement allows the current system to be free from potential noise, or transients, existing in the mains of the motor, since the voltage conditioner block 5 is not directly connected to the line, or alternating voltage source 1, and preferably in parallel to the auxiliary switch 4, as illustrated in FIG. 1.

Alternatively, the voltage conditioner block 5 is associated in parallel to the main switch 3.

An additional advantage of the present invention refers to the fact that, in the current arrangements, the auxiliary winding 22 itself of the single-phase induction motor 2 is capable of filtering noise and transients existing in the alternating voltage source 1.

In other words, based on the teachings of the present invention, the inductive behavior of the auxiliary winding 22, or of the main winding 21, of the single-phase induction motor 2 is capable of filtering noise and transients existing in the alternating voltage source 1.

This arrangement offers reduced costs for the control system when compared to the solutions normally found in prior arts, especially those having specific elements to filter noise, such as surge suppressors, or filters and transients.

Operationally, the electronic control circuit 6 commands the opening and closing of the main 3 and auxiliary 4 switches from the first 13 and second command terminals 14.

In an embodiment designed for the use of thyristors, for example, the electronic control circuit 6 is the part in charge of commanding each electronic switch from its gate.

Preferably, the voltage conditioner block 5 is arranged with the components as disclosed in FIG. 2.

The same figure schematically shows the diagram of the preferred electrical circuit adopted for the voltage conditioner block 5.

Said block 5 is comprised by a reference terminal, formed by the interconnection of the second 8 connection terminal and second 10 power terminal.

FIG. 2 also reveals that the first connection terminal 7 is connected to a first terminal of a first impedance 51.

Preferably, said first impedance 51 is formed by a resistive element, such as a resistor, an inductor or a combination thereof.

The purpose of the first impedance 51 is to limit the input current supplied to the voltage conditioner block 5.

The second terminal of the first impedance 51 is electrically associated to the first terminal of a first capacitor 52. FIG. 2 also shows that the second terminal of the first capacitor 52 is associated concomitantly and electrically to the first terminal of a second impedance 53 and to the terminal cathode of a first diode 54.

The anode of the first diode 54 is associated concomitantly and electrically to the first terminal of a second capacitor 55 and first power terminal 9.

From FIG. 2 it can be seen that the second impedance 53 is electrically associated, by way of its second terminal, to the reference terminal mentioned above. It is important to inform that the second capacitor 55 is also associated to the reference terminal from its second terminal.

The second impedance 53 can be comprised, alternatively, by a zener-type diode, or another device capable of limiting the voltage established between the reference terminal and the anode of the first diode 54. Said voltage will be supplied in the first 9 and second 10 power terminals.

The second capacitor 55 is responsible for accumulating electrical energy, its value sized so as to supply voltage within suitable limits to the electronic control circuit 6, for a predefined maximum time, while there is no voltage applied between the first 7 and second 8 connection terminals.

In this sense the voltage conditioner block 5 is capable of providing a minimum electrical voltage $V_{min}$ to operate the electronic control circuit 6.

FIG. 3 shows a graph identifying the phases involved in operating the control system of an induction motor, according to the teachings of the present invention.

The present invention also provides a control method for a single-phase induction motor pursuant to the system defined above. Said method should guarantee that once a mains voltage V1 is established, a sufficient time elapses until a voltage V6 is established between the first 9 and second 10 power terminals of the voltage adjustment block 5.

In other words, the control method now proposed comprises a single-phase induction motor 2, having a main winding 21 and an auxiliary winding 22, the main 21 and auxiliary 22 windings being associable respectively to the main 3 and auxiliary 4 switches, the present method comprising the following steps:

- electrically connect the main 21 and auxiliary 22 windings of the single-phase motor 2 to a first end of the main 3 and auxiliary 4 switches respectively;
- connect a voltage conditioner block 5 in parallel to the auxiliary switch 4 by way of the first 7 and second 8 connection terminals;
- connect the voltage conditioner block 5 to an electronic control circuit 6 by way of the first 9 and second 10 power terminals;
- connect the electronic control circuit 6 to the main 3 and auxiliary 4 switches by way of the first 13 and second 14 command terminals of the electronic control circuit 6 and first 31 and second 41 drive terminals of the switches;
- electrically connect the single-phase induction motor 2, a first connection terminal 8 of the voltage conditioner block 5 and a second end of the main 3 and auxiliary 4 switches to an alternating voltage source 1;
- if the main 21 and auxiliary 22 windings are turned off, supply electrical power to the voltage conditioner block 5, by way of the first 7 and second 8 connection terminals;
- if the main 21 and auxiliary 22 windings are turned on by the electronic control circuit 6, by way of the first 31 and second 41 drive terminals of the main 3 and auxiliary 4 switches, supply electrical power greater than a minimum electrical voltage $V_{min}$ to the electronic control circuit 6, for a start-up time tp, by way of energy accumulated in the voltage conditioner block 5;
- if the main winding 21 is turned on and the auxiliary winding 22 is turned off, supply power to the voltage conditioner block 5 by way of the first 7 and second 8 connection terminals.

Based on the method described above, it is possible to guarantee that the voltage conditioner block 5 always supplies a voltage higher than the value of the minimum electrical voltage $V_{min}$, sufficient to operate the electronic control circuit 6 adequately.

The operating period of the single-phase induction motor 2 is represented in FIG. 3 by the high level of the command signal S31, the start-up of the motor 2 being indicated in the same figure for the period in which the command signal S41 remains at a high level.

Lastly, it is important to point out, as already mentioned, that the present invention offers a low cost, high reliability and improved durability control system, compared to the solutions available today, since it is not necessary to use additional filtering and protection devices and/or components, such as varistors, discharge tubes, inductors, among others, from the parallel connection of the voltage conditioner block 5 to the auxiliary switch 4 of the induction motor 2.

Accordingly, it is possible to make use of the induced behavior of the start-up winding, in order to use it naturally as a filter for noise and potential transients existing in the mains.

Having described examples of preferred embodiments, it should be understood that the scope of the present invention encompasses other possible variations, only being limited by the content of the claims appended hereto, including therein potential equivalents.

The invention claimed is:

1. Control system for a single-phase induction motor comprising
    at least one electronic control circuit (6),
    at least a main switch (3),
    at least an auxiliary switch (4),
    at least one voltage conditioner block (5),
    the main switch (3) being electrically associated to a main winding (21) of the single-phase induction motor (2),
    the auxiliary switch (4) being electrically associated to an auxiliary winding (22) of the single-phase induction motor (2),
    the electronic control circuit (6) being electrically associated to the voltage conditioner block (5) by way of first and second power terminals (9,10),
    the electronic control circuit (6) being electrically associated to the main and auxiliary switches (3,4) by way of first and second command terminals (13,14), the main and auxiliary switches (3,4) being turned on or off by the electronic control circuit (6), in order to energize or de-energize the main (21) and auxiliary (22) windings, the control system for a single-phase induction motor and the single-phase motor (2) being electrically associable to an alternating voltage source (1), wherein:

the voltage conditioner block (5) is associated in parallel to the auxiliary switch (4) by way of first and second connection terminals (7,8), the voltage conditioner block (5) being capable of accumulating electrical energy when the auxiliary switch (4) is turned off, the voltage conditioner block (5) being arranged to supply electrical power greater than a minimum electrical voltage value ($V_{min}$) to the electronic control circuit (6), by way of the first and second power terminals (9,10), for at least one start-up time (tp), by way of energy accumulated in the voltage conditioner block (5), when the main (3) and auxiliary (4) switches are turned on.

2. Control system for a single-phase induction motor, according to claim 1, wherein the voltage conditioner block (5) is associated in parallel to the main switch (3).

3. Control system for a single-phase induction motor, according to claim 1, wherein the auxiliary winding (22) is capable of filtering noise and transients existing in the alternating voltage source (1).

4. Control system for a single-phase induction motor, according to claim 1, wherein the electronic control circuit (6) commands the turning on and turning off of the main and auxiliary switches (3,4) from the first and second command terminals (13,14).

5. Control system for a single-phase induction motor, according to claim 1, wherein the voltage conditioner block (5) is capable of providing a minimum electrical voltage ($V_{min}$) to operate the electronic control circuit (6).

6. Control system for a single-phase induction motor, according to claim 1, wherein the voltage conditioner block (5) comprises a first impedance (51) electrically associated to a first capacitor (52), being this first capacitor (52) electrically associated to the first terminal of a second impedance (53) and to the terminal cathode of a first diode (54).

7. Control system for a single-phase induction motor, according to claim 6, wherein a terminal anode of the first diode (54) is associated concomitantly and electrically to the first terminal of a second capacitor (55) and first power terminal 9.

8. Control system for a single-phase induction motor, according to claim 7, wherein a second terminal of the second capacitor (55) is electrically associated to a second terminal of the second impedance (53).

9. Control system for a single-phase induction motor, according to claim 7, wherein the second capacitor (55) is arranged to accumulate energy in order to supply electrical power greater than a minimum electrical voltage value ($V_{min}$) to the electronic control circuit (6).

10. Control system for a single-phase induction motor comprising:
at least one electronic control circuit (6),
at least a main switch (3),
at least an auxiliary switch (4),
at least one voltage conditioner block (5),
the main switch (3) being electrically associated to the main winding (21) of the single-phase induction motor (2), the auxiliary switch (4) being electrically associated to an auxiliary winding (22) of the single-phase induction motor (2), the electronic control circuit (6) being electrically associated to the voltage conditioner block (5) by way of first and second power terminals (9,10), the electronic control circuit (6) being electrically associated to the main and auxiliary switches (3,4) by way of first and second command terminals (13,14), the main and auxiliary switches (3,4) being turned on or off by the electronic control circuit (6), in order to energize or de-energize the main (21) and auxiliary (22) windings, the control system for a single-phase induction motor and the single-phase motor (2) being electrically associable to an alternating voltage source (1), wherein:

the voltage conditioner block (5) is electrically associated and in parallel to the auxiliary switch (4) or to the main switch (3) by way of first and second connection terminals (7,8), the voltage conditioner block (5) is capable of accumulating electrical energy when the auxiliary switch (4) is turned off, the inductive behavior of the auxiliary winding (22) or of the main winding (21) of the single-phase induction motor (2) being is capable of filtering noise and transients existing in the alternating voltage source (1).

11. Control method for a single-phase induction motor, the single-phase induction motor (2) comprising a main winding (21) and an auxiliary winding (22), the main (21) and auxiliary (22) windings being associable respectively to the main (3) and auxiliary (4) switches, said method comprising:

electrically connecting the main (21) and auxiliary (22) windings of the single-phase motor (2) to a first end of the main (3) and auxiliary (4) switches respectively;

connecting a voltage conditioner block (5) in parallel to the auxiliary switch (4) by way of first and second connection terminals (7,8);

connecting the voltage conditioner block (5) to an electronic control circuit (6) by way of first and second power terminals (9,10);

connecting the electronic control circuit (6) to the main and auxiliary switches (3,4) by way of first and second command terminals (13,14) of the electronic control circuit (6) and first and second drive terminals of the switches (31,41);

electrically connecting the single-phase induction motor (2), a first connection terminal (8) of the voltage conditioner block (5) and a second end of the main (3) and auxiliary (4) switches to an alternating voltage source (1);

if the main (21) and auxiliary (22) windings are turned off, supplying electrical power to the voltage conditioner block (5) by way of first and second connection terminals (7,8);

if the main (21) and auxiliary (22) windings are turned on by the electronic control circuit (6), by way of first and second drive terminals (31,41) of the main (3) and auxiliary (4) switches, providing electrical power greater than a minimum electrical voltage value ($V_{min}$) to the electronic control circuit (6), for a start-up time (tp), by way of energy accumulated in the voltage conditioner block (5); and if the main winding (21) is turned on and the auxiliary winding (22) is turned off, providing power to the voltage conditioner block (5) by way of first and second connection terminals (7,8).

\* \* \* \* \*